United States Patent [19]

Ramsbotham

[11] 3,957,962

[45] May 18, 1976

[54] PROCESS FOR THE PREPARATION OF HYDROGEN-RICH GAS

[75] Inventor: John Ramsbotham, Amsterdam, Netherlands

[73] Assignee: Shell Oil Company, Houston, Tex.

[22] Filed: Mar. 22, 1974

[21] Appl. No.: 453,753

[30] Foreign Application Priority Data
Apr. 17, 1973  Netherlands.................... 7305340

[52] U.S. Cl............................... 423/655; 423/656; 423/437; 252/373
[51] Int. Cl.² .................... C01B 1/08; C01B 31/20; C01B 2/10; C01B 1/03
[58] Field of Search.................... 423/656, 655, 437

[56] References Cited
UNITED STATES PATENTS

| | | | |
|---|---|---|---|
| 3,170,758 | 2/1965 | Honerkamp | 423/656 X |
| 3,251,652 | 5/1966 | Pfefferle | 423/656 |
| 3,392,001 | 7/1968 | Lorenz et al. | 423/656 |
| 3,529,935 | 9/1970 | Lorenz et al. | 423/656 X |
| 3,545,926 | 12/1970 | Schlinger et al. | 423/656 X |
| 3,615,217 | 10/1971 | O'Brien et al. | 423/656 |
| 3,798,005 | 3/1974 | Koch | 423/656 X |
| 3,850,840 | 11/1974 | Aldridge et al. | 423/656 X |

FOREIGN PATENTS OR APPLICATIONS

| | | | |
|---|---|---|---|
| 961,860 | 6/1964 | United Kingdom | 423/656 |

*Primary Examiner*—Edward Stern

[57] ABSTRACT

There is disclosed a process for the preparation of hydrogen-rich gas by passing a gas mixture containing carbon monoxide and water vapor over a sulfided catalyst which includes nickel and/or cobalt, molybdenum and aluminum with the aluminum being present in an amount of from 0.1 to 1.0 part of aluminum per part of nickel and/or cobalt on a weight basis. The catalyst is prepared by impregnating an alumina carrier with one or more solutions of compounds of the catalysts in which at least 40%w of the aluminum that is used is added to the carrier by co-impregnation with the nickel and/or cobalt.

19 Claims, No Drawings

PROCESS FOR THE PREPARATION OF HYDROGEN-RICH GAS

BACKGROUND OF THE INVENTION

This invention relates to a process for the preparation of a hydrogen-rich gas by converting a carbon monoxide-containing gas with steam by the water-gas shift reaction:

$$CO + H_2O = CO_2 + H_2$$

This conversion which is an important part of most commercial processes for the preparation of hydrogen is generally carried out in two steps in the presence of a catalyst. The first conversion step which is performed at a temperature above 300°C is referred to as high-temperature water-gas shift reaction. In the second conversion step, the low-temperature water-gas shift reaction, a temperature below 300°C is used. Since most of the catalysts now used for the water-gas shift reaction are only sufficiently active in rather a limited temperature range, it is usual to use a different catalyst in each of the two above-mentioned conversion steps.

A serious drawback of most of the catalysts so far proposed for the water-gas shift reaction is their sensitivity to the presence of sulfur in the gas to be converted. This applies in particular to the catalysts which have been proposed for the low-temperature water-gas shift reaction and which are usually completely poisoned in a very short time by the presence of sulfur in the gas. Although this drawback applies to a lesser extent to the catalysts proposed for the high-temperature water-gas shift reaction, the activity of many such catalysts decreases substantially in the presence of sulfur in the gas to be converted, especially in the case of the higher sulfur concentrations.

The carbon monoxide-containing gas used in most commercial processes for the preparation of hydrogen by the water-gas shift reaction is obtained by incomplete combustion of sulfur-containing hydrocarbon mixtures and therefore it contains sulfur. In view of the sulfur sensitivity of the catalysts used in the water-gas shift reaction, sulfur must be carefully removed from such gas mixture before it is subjected to the water-gas shift reaction. This removal of sulfur usually takes place in a separate process step and is carried out at low temperature.

The necessity of carrying out a desulfurization step at low temperature in the hydrogen preparation process preceding the water-gas shift reaction, is extremely unattractive from the point of view of heat economy. In this case the sulfur-containing gas which has a relatively high temperature must first be cooled and subsequently be reheated after desulfurization to the temperature required for carrying out the high-temperature water-gas shift reaction. Consequently, there is an urgent need for catalysts for the water-gas shift reaction which are unaffected by sulfur in the gas to be converted so that a separate process for removing sulfur can be avoided.

A class of catalysts is known which fulfils this need. They are sulfidic catalysts which comprise nickel and/or cobalt and molybdenum on alumina as a carrier, which alumina meets the following requirements with respect to physical composition and chemical properties:

1. silica content less than 1% by weight
2. sulfate content less than 1% by weight
3. halogen content less than 0.2% by weight
4. surface area greater than 150 m²/g
5. pore volume greater than 0.3 ml/g
6. average pore diameter (calculated as $4 \times 10^3$ x quotient of pore volume and surface area) greater than 4.5 nm
7. product of surface area and compacted bulk density greater than 125 m²/ml.

The catalysts are preferably prepared by impregnating an alumina carrier meeting the above criteria with one or more solutions of compounds of nickel and/or cobalt and molybdenum, followed by drying and calcining of the composition. It is essential that the alumina carrier meet the above-mentioned specifications since a catalyst made with an alumina carrier which does not meet these specifications has insufficient activity for the water-gas shift reaction. Although these known catalysts exhibit a high activity for the water-gas shift reaction, it is a drawback that only a rather limited number of aluminas are suitable for their preparation. These will be referred to hereinafter as the suitable carriers of the prior art.

THE INVENTION

It has been found that it is possible to depart from the requirements with respect to the suitable alumina carriers of the prior art if the catalysts are prepared on ordinary alumina carriers by impregnating them with one or more aqueous solutions which include nickel and/or cobalt, molybdenum and from 0.1 to 1.0 parts by weight of aluminum per part by weight of nickel and/or cobalt when at least 40% by weight of the aluminum is added to the carrier by co-impregnation with nickel and/or cobalt.

If the catalyst is prepared in this way, it is possible to prepare good catalysts even when using aluminas previously thought to be unfit for this purpose. It has further been found that if the catalyst is prepared in this way, starting from aluminas which are suitable carriers of the prior art, catalysts with a higher activity for the water-gas shift reaction are obtained than when those carriers are used without aluminum in the impregnating solution.

As a result of this invention, any alumina is now suitable for use as carrier for an active catalyst for the water-gas shift reaction.

The invention therefore relates to a process for the preparation of a hydrogen-rich gas by converting a carbon monoxide-containing gas with steam, in which the conversion is carried out in the presence of a sulfidic catalyst which comprises nickel and/or cobalt, molybdenum and 0.1 to 1.0 parts by weight of aluminum per part by weight of nickel and/or cobalt on alumina as carrier, which catalyst is prepared by impregnating the carrier with one or more solutions of compounds of nickel and/or cobalt, molybdenum and aluminum, in which at least 40% by weight of the aluminum is supplied to the carrier by co-impregnation with the nickel and/or cobalt.

In the process according to the invention it is essential that 0.1 to 1.0 parts by weight of aluminum per part by weight of nickel and/or cobalt be supported on the alumina carrier. Smaller quantities of aluminum are unsuitable for obtaining the desired effect. The use of larger quantities of aluminum yields catalysts with reduced activity for the water-gas shift reaction. Catalysts comprising 0.3 to 0.8 parts by weight of aluminum per part by weight of nickel and/or cobalt are preferred.

In the process according to the invention it is further essential that at least 40% by weight of the aluminum be supplied to the carrier by co-impregnation with the nickel and/or cobalt. Preferably at least 50% by weight of the aluminum and in particular substantially all the aluminum should be supplied to the carrier by co-impregnation with the nickel and/or cobalt.

The quantity of nickel and/or cobalt and molybdenum, as well as the atomic ratio between these metals present in the catalyst which can be used according to the invention, may vary widely. Preferred catalysts are those which contain 1 to 20 parts by weight of nickel and/or cobalt per 100 parts by weight of alumina and in which the atomic ratio of nickel and/or cobalt on the one hand and molybdenum on the other is 0.05 to 3.0 in particular catalysts which comprise 1 to 4 parts by weight of nickel and/or cobalt per 100 parts by weight of alumina and in which said atomic ratio of nickel and/or cobalt to molybdenum is 0.1 to 1.0. Nickel-containing catalysts are preferred over cobalt-containing catalysts. A very suitable catalyst of this invention is one which contains about 3 parts by weight of nickel, about 14 parts by weight of molybdenum and about 2 parts by weight of aluminum per 100 parts by weight of alumina carrier.

The preparation of the catalysts of this invention is carried out by impregnating an alumina carrier in one or more steps with one or more solutions of compounds of nickel and/or cobalt, molybdenum and aluminum followed by drying and calcining the resultant composition. If the impregnation is carried out in several steps, the material can be dried and calcined between the successive impregnation steps. Drying is preferably performed at temperatures between 50°C and 150°C, and calcining between 450° and 550°C. A highly suitable preparation method for the present catalysts is the "dry impregnation technique." This technique involves contacting the carrier with a volume of aqueous solution of the metal compounds, which corresponds exactly to the available pore volume of the carrier to be impregnated.

The sequence in which the metals are applied to the carrier is not critical as long as at least 40% by weight of the aluminum is co-impregnated on the carrier together with the nickel and/or cobalt. The remainder of the aluminum may be supplied to the carrier before or after the nickel and/or cobalt, for example, in a separate impregnation step or together with the molybdenum. Th catalysts are preferably prepared by co-impregnating the carrier with one single aqueous solution comprising compounds of nickel and/or cobalt, molybdenum and aluminum, followed by drying and calcining of the composition. Examples of suitable water-soluble nickel, cobalt, molybdenum and aluminum compounds are nitrates, carbonates and formates of nickel and cobalt, aluminum nitrate, sodium and potassium aluminate and ammonium molybdate. To increase the solubility of these compounds and to stabilize their solutions, certain compounds, such as ammonium hydroxide, monoethanol amine and sorbitol, may be added to the solutions.

The use of the suitable aluminas of the prior art yields catalysts according to the invention with a higher activity for the water-gas shift reaction than the use of aluminas which do not meet one or more of those requirements. For the preparation of the catalysts according to the invention, the suitable aluminas of the prior art are preferred as carriers.

The catalysts of this invention must be used in sulfidic form. The sulfidation of the catalysts can be performed by the known sulfidation methods for catalysts. The sulfidation can, for example, be performed by treating the catalysts with a sulfur-containing gas, such as a mixture of hydrogen and hydrogen sulfide, a mixture of hydrogen and carbon disulfide or a mixture of hydrogen and a mercaptan, such as butyl mercaptan. The sulfidation can also be carried out by treating the catalyst with hydrogen and a sulfur-containing hydrocarbon oil, such as a sulfur-containing kerosine or gas oil. The catalysts of this invention preferably are sulfided by being heated slowly in a mixture of hydrogen, hydrogen sulfide and steam to a temperature between 325°C and 375°C and subsequently maintained at this temperature until sulfiding is completed. To ensure that the sulfidic form of the catalyst is maintained during the water-gas shift reaction, it is preferred that the carbon monoxide-containing gas contain at least 10 ppmw sulfur. Such a quantity of sulfur will generally by nature be present in the carbon monoxide-containing gas. If this is not the case, a small quantitiy of a sulfur compound should be added to the carbon monoxide-containing gas either continuously or periodically during the conversion.

As already stated, the preparation of the hydrogen-rich gas by converting a carbon monoxide-containing gas with steam by the water-gas shift reaction is an important part of most commercial processes for the preparation of hydrogen. The process according to the invention is highly suitable for use as a part of such a hydrogen preparation process. The carbon monoxide-containing gas is generally obtained in these processes by incomplete combustion of a hydrocarbon or a hydrocarbon mixture with oxygen. It is preferred to add steam to the mixture as moderator. The incomplete combustion produces a crude gas which consists mainly of carbon monoxide and hydrogen. The hydrocarbon mixture used is preferably a petroleum fraction. Both distillate and residual petroleum fractions are suitable for this purpose. Under certain conditions carbon, for example as a slurry in a hydrocarbon oil, may also be used as feed. It is usual in most processes to withdraw heat from the crude gases which leave the combustion reactor and which have a very high temperature. This may very conveniently be performed by contacting the gases with water in a waste heat boiler in which high-pressure steam is formed and the temperature of the crude gas is reduced. Depending on the chosen starting material and the conditions applied in the combustion reactor, the cooled gas may still be relatively hot and may contain a considerable quantity of soot. If a conventional reactor is used, the soot must be removed from the gas before being subjected to the water-gas shift reaction to avoid fouling the catalyst. However, a recently developed reactor which has void gas channels through which the gas can flow and catalyst behind the gas-permeable walls of the channels is extremely suitable for use if the carbon monoxide-containing gas to be converted in the process of the invention contains soot.

The water-gas shift reaction which may in principle take place at temperatures between 175°C and 425°C is in practice usually carried out in several steps to take advantage of reaction rates and the position of the equilibrium at different temperatures. The reaction is effected partly above 300°C (high-temperature water-gas shift reaction) and partly below 300°C (low-temperature water-gas shift reaction). The reaction is preferably carried out by passing the gas to be converted through one or more reactors at a temperature between 325°C and 400°C, which reactors contain a high-temperature water-gas shift catalyst, and subsequently passing the partially converted gas mixture through a reactor at a temperature between 200°C and 275°C, which reactor contains a low-temperature water-gas shift catalyst. If the process according to the invention is carried out in several steps at different temperatures, partly above and partly below 300°C, a catalyst according to the invention is preferred for both the low-temperature and the high-temperature water-gas shift reaction. If desired, a catalyst outside the scope of the invention, for example a commercial iron-chromium catalyst, may be used for the high-temperature water-gas shift reaction.

The pressure at which the water-gas shift reaction is carried out may vary widely. The reaction is preferably carried out at a pressure between 10 and 100 bar, in particular between 20 and 80 bar. The quantity of steam present in the gas mixtue which is subjected to the water gas-shift reaction is preferably 1–50 mol/mol of carbon monoxide.

If pure hydrogen is desired, the product from the water-gas shift process must be treated to remove sulfur, soot, carbon monoxide and carbon dioxide.

DETAILED DESCRIPTION OF THE INVENTION

To illustrate the invention, nineteen catalysts identified as catalysts I through XIX were prepared by dry impregnation of three alumina carriers identified as aluminas 1 through 3 with aqueous solutions of nickel nitrate, cobalt nitrate, ammonium molybdate and aluminum nitrate. The carriers were used in the form of 1.5 mm extrudates.

The catalysts I–VIII were prepared by co-impregnating the indicated alumina carriers with an aqueous solution comprising nickel nitrate, ammonium molybdate and aluminum nitrate.

Catalyst IX was prepared by co-impregnating alumina 2 with an aqueous solution comprising cobalt nitrate, ammonium molybdate and aluminum nitrate.

Catalyst X was prepared by co-impregnating alumina 3 with an aqueous solution comprising nickel nitrate and aluminum nitrate, drying the impregnated material at 120°C and impregnating the dried material with an aqueous solution comprising ammonium molybdate.

Catalyst XI was prepared by co-impregnating alumina 3 with an aqueous solution comprising nickel nitrate and 50% by weight of the total quantity of aluminum to be impregnated in the form of aluminum nitrate, drying the impregnated material at 120°C and co-impregnating the dried material with an aqueous solution comprising ammonium molybdate and the remaining 50% by weight of the total quantity of aluminum to be impregnated in the form of aluminum nitrate.

Catalyst XII was prepared by co-impregnating alumina 3 with an aqueous solution comprising nickel nitrate and 30% by weight of the total quantity of aluminum to be impregnated in the form of aluminum nitrate, drying the impregnated material at 120°C and co-impregnating the dried material with an aqueous solution comprising ammonium molybdate and the remaining 70% by weight of the total quantity of aluminum to be impregnated in the form of aluminum nitrate.

Catalyst XIII was prepared by impregnating alumina 3 with an aqueous solution comprising aluminum nitrate, drying the impregnated material at 120°C and co-impregnating the dried material with an aqueous solution comprising nickel nitrate and ammonium molybdate.

Catalyst XIV was prepared by impregnating alumina 3 with an aqueous solution comprising nickel nitrate, drying the impregnated material at 120°C and co-impregnating the dried material with an aqueous solution comprising ammonium molybdate and aluminum nitrate.

Catalyst XV was prepared by co-impregnating alumina 1 with an solution solutin comprising nickel nitrate, ammonium molybdate and aluminum nitrate.

The catalysts XVI–XVIII were prepared by co-impregnating the indicated carriers with an aqueous solution comprising nickel nitrate and ammonium molybdate.

Catalyst XIX was prepared by co-impregnating alumina 2 with an aqueous solution comprising cobalt nitrate and ammonium molybdate.

The catalysts I-IX and XV-XIX were dried at 120°C after impregnation and calcined at 500°C for 3 hours. The catalysts X-XIV were dried at 120°C after the final impregnation and calcined at 500°C for 3 hours.

The catalysts III-V, XV and XVIII were tested as such in the form of 1.5 mm extrudates. The catalysts I, II, VI–XIV, XVI, XVII and XIX were tested in the form of particles having a diameter of 0.2–0.6 mm which were prepared from the 1.5 mm extrudates by grinding.

The chemical composition and the physical properties of the alumina carriers 1–3 are given in Table A. The composition of the catalysts I–XIX is shown in Tables B–E.

The catalysts I-XIX were tested for their activity for the water-gas shift reaction by passing a mixture of a feed gas and steam in a ration of 1.35 mol of steam per mol of feed gas through a reactor at different temperatures and at a pressure of 31 bar and a space velocity of 3300, 9000 and 20000 liters respectively of wet gas per liter of catalyst per hour, which reactor contained the relevant catalyst, and determining the carbon monoxide content of the dry product after the conversion. The feed gas was obtained by mixing a carbon monoxide-containing gas and a hydrogen sulfide-containing gas. The composition of the gases used is given in Table F.

The catalysts were sulfided in situ. To this end the above-mentioned hydrogen sulfide-containing gas was passed over the catalyst at a rate of 3 l/h, while the temperature was raised slowly from 20°C to 350°C. When the temperature reached 100°C, steam was introduced at a rate of 5.6 l/h. During the sulfidation the pressure was raised slowly from atmospheric pressure. The heating rate was so chosen that the temperature of 350°C was reached after about 2.5 hours. The pressure which was about 10 bar when the temperature of 350°C was reached, was subsequently raised rapidly to the working pressure of 31 bar by introducing the above-mentioned carbon monoxide-containing gas. The temperature was maintained at 350°C for 1 hour, while the above-mentioned mixture of feed gas and steam was passed over the catalyst. The reactor was subsequently brought to the desired temperature. For the sake of completeness, the test also included two commercial catalysts for the water-gas shift reaction (XX and XXI). Catalyst XX is a copper-zinc catalyst which is commercially available under the trade name "GIRDLER-G66B" as a catalyst for the low-temperature water-gas shift reaction. Catalyst XXI is an iron-chromium catalyst which is commercially available under the trade name "GIRDLER G3A" as a catalyst for the high-temperature water-gas shift reaction.

The results of the experiments are given in the Tables B-E. In the experiments stated in the Tables B and C (carried out at a space velocity of 3300 and 9000 liters of wet gas per liter of catalyst per hour respectively) a catalyst is only considered sufficiently active for the water-gas shift reaction if the carbon monoxide content of the dry product after conversion at a temperature of 225°C is less than 0.6 and 1.4% by volume respectively. The term conversion used in the following tables refers to the % volume of carbon monoxide in the dry product at the indicated temperature.

TABLE A

| | Alumina Carrier Number | | |
|---|---|---|---|
| | 1 | 2 | 3 |
| Silica content (% by weight) | <0.4 | <0.4 | 1.4 |
| Sulfate content (% by weight) | 0.1 | <0.1 | 1.9 |
| Halogen content (% by weight) | <0.1 | <0.1 | <0.1 |
| Surface area (m²/g) | 231 | 230 | 219 |
| Pore volume (ml/g) | 0.41 | 0.59 | 0.52 |
| Compacted bulk density (g/ml) | 0.85 | 0.71 | 0.74 |
| Average pore diameter (nm) | 7.1 | 10.3 | 11.3 |
| Product of surface area and compacted bulk density (m²/ml) | 196 | 164 | 162 |

TABLE B

Catalysts in the form of particles having a diameter of 0.2–0.6 mm. Space velocity: 3300 liters of wet gas per liter of catalyst per hour.

| Exp. No. | Catalyst No. | Alumina Carrier No. | Ni | Co | Mo | Al | 300°C | 250°C | 225°C |
|---|---|---|---|---|---|---|---|---|---|
| 1 | XVI | 1 | 3.5 | — | 8 | — | 1.0 | 0.6 | 0.4 |
| 2 | I | 1 | 3.5 | — | 8 | 3 | 0.8 | 0.4 | 0.3 |
| 3 | XVII | 3 | 3.5 | — | 8 | — | 1.0 | 0.7 | 0.9 |
| 4 | II | 3 | 3.5 | — | 8 | 3 | 0.8 | 0.6 | 0.5 |
| 5 | XIX | 2 | — | 3.5 | 8 | — | 1.0 | 0.7 | 0.5 |
| 6 | IX | 2 | — | 3.5 | 8 | 3 | 0.9 | 0.5 | 0.4 |
| Equilibrium level | | | | | | | 0.78 | 0.37 | 0.24 |

TABLE C

Catalysts in the form of particles having a diameter of 0.2–0.6 mm. Space velocity: 9000 liters of wet gas per liter of catalyst per hour.

| Exp. No. | Catalyst No. | Alumina Carrier No. | Ni | Mo | Al | 300°C | 250°C | 225°C |
|---|---|---|---|---|---|---|---|---|
| 7 | II | 3 | 3.5 | 8 | 3 | 1.0 | 1.0 | 1.1 |
| 8 | X | 3 | 3.5 | 8 | 3 | 1.0 | 1.0 | 1.2 |
| 9 | XI | 3 | 3.5 | 8 | 3 | 0.8 | 0.9 | 1.3 |
| 10 | XII | 3 | 3.5 | 8 | 3 | 1.0 | 1.1 | 1.5 |
| 11 | XVII | 3 | 3.5 | 8 | — | 0.9 | 1.1 | 1.5 |
| 12 | XIII | 3 | 3.5 | 8 | 3 | 0.8 | 1.2 | 1.5 |
| 13 | XIV | 3 | 3.5 | 8 | 3 | 0.9 | 1.2 | 1.5 |
| Equilibrium level | | | | | | 0.78 | 0.37 | 0.24 |

TABLE D

Catalysts in the form of 1.5 mm extrudates. Space Velocity: 9000 liters of wet gas per liter of catalyst per hour.

| Exp. No. | Catalyst No. | Alumina carrier No. | Ni | Mo | Al | Conversion at 225°C |
|---|---|---|---|---|---|---|
| 14 | XVIII | 1 | 3.5 | 8 | — | 1.9 |
| 15 | III | 1 | 3.5 | 8 | 1.5 | 1.2 |
| 16 | IV | 1 | 3.5 | 8 | 2 | 1.2 |
| 17 | V | 1 | 3.5 | 8 | 3 | 1.8 |
| 18 | XV | 1 | 3.5 | 8 | 5 | 3.2 |

TABLE E

Catalysts in the form of particles having a diameter of 0.2–0.6 mm. Space velocity: 20,000 liters of wet gas per liter of catalyst per hour.

| Exp. No. | Catalyst No. | Carrier No. | Ni | Mo | Al | 225°C | 250°C | 300°C | 325°C | 350°C | 400°C |
|---|---|---|---|---|---|---|---|---|---|---|---|
| 19 | VI | 2 | 3.5 | 8 | 1.5 | 3.6 | 3.1 | 2.9 | 2.7 | 2.5 | 2.6 |
| 20 | VII | 2 | 4 | 11.9 | 2 | 2.2 | 1.9 | 1.1 | 1.5 | 1.6 | 2.6 |
| 21 | VIII | 2 | 2.9 | 13.7 | 2 | 1.9 | 0.8 | 0.9 | 1.3 | 1.6 | 2.6 |
| 22* | XX | GIRDLER-G66B | | | | 2.0 | 0.4 | 0.9 | — | — | — |
| 23* | XXI | GIRDLER-G3A | | | | 5.8 | 5.7 | 5.4 | 4.6 | 4.9 | 3.0 |

TABLE E-continued

Catalysts in the form of particles having a diameter of 0.2–0.6 mm. Space velocity: 20,000 liters of wet gas per liter of catalyst per hour.

| Exp. No. | Catalyst No. | Carrier No. | Metal load, g/100 g of carrier Ni | Mo | Al | Conversion 225°C | 250°C | 300°C | 325°C | 350°C | 400°C |
|---|---|---|---|---|---|---|---|---|---|---|---|
| 24 | XXI | GIRDLER-G3A | | | | 5.8 | 5.7 | 5.6 | 5.0 | 4.8 | 3.0 |
| Equilibrium level | | | | | | 0.24 | 0.37 | 0.78 | 1.15 | 1.55 | 2.55 |

*The experiments 22 and 23 were carried out with a sulfur-free feed. Catalyst XX is not stable at high temperature.

TABLE F

| Components | Composition of the gases in % by volume Carbon monoxide-containing gas | Hydrogen sulfide-containing gas | Feed gas |
|---|---|---|---|
| Carbon monoxide | 6.1 | — | 5.8 |
| Carbon dioxide | 32.0 | — | 29.4 |
| Hydrogen | 61.5 | 92 | 64.1 |
| Methane | 0.4 | — | 0.3 |
| Hydrogen sulfide | — | 8 | 0.4 |

Experiments 2, 4, 6–9, 15–17 and 19–21 carried out with the catalysts I-XI, are experiments according to the invention. The other experiments, which were carried out with the catalysts XII-XXI which are outside the scope of the present invention, have been included for comparison.

In the preparation of the catalysts XII-XIV, the requirement that at least 40% by weight of the aluminum must be supported on the carrier by co-impregnation with the nickel was not fulfilled.

In the preparation of the catalysts XV-XIV, the requirement that 0.1–1.0 parts by weight of aluminum per part by weight of nickel or cobalt must be supported on the carrier was not fulfilled.

The results given in the Tables B-E give rise to the following remarks.

Table B

Comparison of the results of the experiments 3 and 4 reveals that starting from alumina 3 which, according to the prior art, is unsuitable as a carrier for a sufficiently active catalyst for the water-gas shift reaction as shown by the results obtained using catalyst XVII, it is nevertheless possible to prepare a good catalyst for this purpose if the preparation is carried out in accordance with the present invention as shown by the results obtained using catalyst II.

Comparison of the results of experiments 1 and 2 with the results of experiments 5 and 6 reveals that starting from the aluminas 1 and 2 which are suitable carriers of the prior art (catalysts XVI and XIX), catalysts with a higher activity can be prepared for this purpose, if the preparation is carried out in accordance with the invention (catalysts I and IX).

Table C

The results stated in Table C again show that starting from alumina 3 which, according to the prior art, is unsuitable as a carrier for a sufficiently active catalyst for the water-gas shift reaction (catalyst XVIII), it is nevertheless possible to prepare a good catalyst for this purpose if the preparation is carried out in accordance with the invention (catalysts II, X and XI). The results stated in this Table further show that catalysts with insufficient activity for the water-gas shift reaction are obtained, if the aluminum is supported incorrectly on the carrier (catalysts XII-XIV).

Table D

The results given in Table D again show that starting from alumina 1 which is a suitable carrier of the prior art for an active catalyst for the water-gas shift reaction (catalyst XVIII), it is possible to prepare catalysts with a higher activity for this purpose if the preparation is carried out in accordance with the invention (catalysts III-V). The results given in this Table further show that a catalyst with a lower activity is obtained if excess aluminum is supported on the carrier (catalyst XV). In the presence of 3.5 parts by weight of nickel and 8 parts by weight of molybdenum per 100 parts by weight of carrier, the catalyst has an optimum activity, if it moreover contains 1.5–2.0 parts by weight of aluminum per 100 parts by weight of carrier.

Table E

The results given in Table E show that catalysts prepared in accordance with the present invention exhibit a high activity (catalysts VI-VIII) both for the low-temperature and for the high-temperature water-gas shift reaction. Comparison of the results of the experiments 21 and 22 reveals that for the low-temperature water-gas shift reaction the activity of catalyst VIII is at the same high level in the presence of sulfur as that of the commercial catalyst XX in the absence of sulfur. Catalyst VIII, however, also possesses a high activity for the high-temperature water-gas shift reaction in the presence of sulfur. The commercial catalyst XX, which can only be used in the absence of sulfur in view of the very rapid poisoning by sulfur, is unsuitable for use in the high-temperature water-gas shift reaction under sulfur-free conditions. Comparison of the results of the experiments 23 and 24 reveals that the activity of the commercial catalyst XXI for the high-temperature water-gas shift reaction is considerably lower than that of the catalyst VI-VIII of the invention. This applies both to the use of catalyst XXI in the presence (experiment 24) and in the absence (experiment 23) of sulfur. In view of the carbon monoxide content of the feed gas, which is 5.8% by volume, it may finally be remarked that the commercial catalyst XXI exhibits hardly any activity for the low-temperature water-gas shift reaction.

What is claimed is:

1. A process for the preparation of a hydrogen-rich gas by converting a gas mixture including carbon monoxide and steam, comprising contacting said mixture at reaction conditions and a temperature between 175°C and 425°C and a pressure between 10 and 100 bar with a sulfided catalyst which comprises nickel and/or cobalt, molybdenum and 0.1–1.0 parts by weight of impregnated aluminum per part by weight of nickel and/or cobalt, all supported on an alumina carrier in an amount of 1–20 parts by weight of nickel and/or cobalt per 100 parts of alumina and the atomic ratio of nickel and/or cobalt to molybdenum is from 0.05 to 3.0, which catalyst is prepared by impregnating the carrier with one or more solutions of compounds of nickel and/or cobalt, molybdenum and aluminum in which at least 40% by weight of the aluminum is supported on the carrier by co-impregnation with the nickel and/or cobalt followed by drying and calcining the impregnated carrier.

2. The process of claim 1 wherein the catalyst comprises 0.3–0.8 parts by weight of impregnated aluminum per part by weight of nickel and/or cobalt.

3. The process of claim 1 wherein at least 50% by weight of the impregnated aluminum is supported on the carrier by co-impregnation with nickel and/or cobalt.

4. The process of claim 1 wherein the catalyst comprises 1–20 parts by weight of nickel and/or cobalt per 100 parts by weight of alumina, and the atomic ratio between nickel and/or cobalt on the one hand and molybdenum on the other is 0.05–3.0.

5. The process of claim 4 wherein the catalyst comprises 1–4 parts by weight of nickel and/or cobalt per 100 parts by weight of alumina and that the atomic ratio between nickel and/or cobalt on the one hand and molybdenum on the other is 0.1–1.0.

6. The process of claim 1 wherein the catalyst comprises nickel, molybdenum and aluminum.

7. The process of claim 6 wherein the catalyst comprises about 3 parts by weight of nickel, about 14 parts by weight of molybdenum and about 2 parts by weight of impregnated aluminum per 100 parts by weight of alumina carrier.

8. The process of claim 1 wherein the catalyst is prepared by co-impregnating the carrier with a single aqueous solution containing water soluble compounds of nickel and/or cobalt, molybdenum and aluminum, followed by drying and calcining the impregnated carrier.

9. The process of claim 1 wherein the catalyst is prepared by impregnating with a volume of solution equal to the pore volume of the carrier.

10. The process of claim 1 wherein the catalyst carrier is an alumina which contains less than 1% by weight silica, less than 1% by weight sulfate, less than 0.2% by weight halogen, has a surface area greater than 150 m²/g, a pore volume greater than 0.3 ml/g, an average pore diameter (calculated as $4 \times 10^3 \times$ quotient of pore volume and surface area) greater than 4.5 nm, and wherein the product of surface area and compacted bulk density is greater than 125 m²/ml.

11. The process of claim 1 wherein the carbon monoxide-containing gas comprises at least 10 ppmw of sulfur.

12. The process of claim 1 wherein the catalyst is sulfided by heating it slowly to a temperature between 325°C and 375°C in a mixture of hydrogen, hydrogen sulfide and steam, and subsequently maintaining it at this temperature until sulfiding is complete.

13. The process of claim 1 wherein the carbon monoxide-containing gas contains carbon monoxide and hydrogen and is obtained by incomplete combustion of a hydrocarbon with oxygen.

14. The process of claim 13 wherein the hydrocarbon is a petroleum fraction.

15. The process of claim 1 wherein said reaction is effected in at least two steps, at least one above and at least one below 300°C, to take advantage of reaction rates and the position of the equilibrium.

16. The process of claim 15 wherein the process is effected by passing the gas to be converted through two or more high temperature reactors at a temperature between 325°C and 400°C and subsequently passing the partly converted gas mixture through at least one low temperature reactor at a temperature between 200°C and 275°C and said low-temperature reactors contain said catalyst.

17. The process of claim 15 wherein said catalyst is used in the reaction step above 300°C.

18. The process of claim 1 wherein contact between said gas and said catalyst is effected at a pressure between 20 and 80 bar.

19. The process of claim 1 wherein the gas mixture, which is subjected to the water-gas shift reaction, comprises 1–50 mol of steam per mol of carbon monoxide.

* * * * *